(12) United States Patent
Bourland et al.

(10) Patent No.: US 6,384,093 B1
(45) Date of Patent: May 7, 2002

(54) METHOD OF MELT PROCESSING CROSSLINKED THERMOPLASTIC MATERIAL

(75) Inventors: Larry Bourland, York, PA (US); Richard A. Freundlich, New York, NY (US); Rudolph G. Nwana, Piscataway, NJ (US); Vincent W. Herran, Greenville, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/887,079

(22) Filed: Jun. 22, 2001

(51) Int. Cl.$^7$ .............................. C08J 11/04; C08L 23/06
(52) U.S. Cl. .................... 521/40.5; 521/42.5; 521/44.5; 521/45.5; 521/46; 521/46.5; 521/47; 521/48; 521/49; 521/49.8
(58) Field of Search ................ 521/40.5, 42.5, 521/44.5, 45.5, 46, 46.5, 47, 48, 49, 49.8

(56) References Cited

U.S. PATENT DOCUMENTS

| 4,551,380 A | 11/1985 | Schoenberg |
| 5,391,582 A | 2/1995 | Muschiatti et al. |
| 5,895,790 A | 4/1999 | Good |
| 5,928,798 A | 7/1999 | Buongironi et al. |
| 6,045,882 A | 4/2000 | Sandford |
| 6,090,862 A | 7/2000 | Tatsuda et al. |
| 6,096,793 A | 8/2000 | Lee et al. |
| 6,127,434 A | 10/2000 | Triboulet et al. |

FOREIGN PATENT DOCUMENTS

| JP | 56106939 | 8/1981 |
| WO | 96/27485 | 9/1996 |

OTHER PUBLICATIONS

Good, "Crosslinked PE can be Recycled," Plastics Technology, v38, n6, p43, Jun., 1992.

*Primary Examiner*—Morton Foelak
(74) *Attorney, Agent, or Firm*—Daniel B. Ruble

(57) ABSTRACT

A method of enhancing the melt-processibility of crosslinked plastic or recycling crosslinked plastic and the products formed by these methods. The melt processibility of a crosslinked thermoplastic resin may be enhanced by mixing it with a low viscosity polymeric resin having a specified melt flow index relative to the melt flow index of the crosslinked thermoplastic resin, and exposing the mixture to mechanical shearing energy to produce a processed mixture having enhanced melt flow characteristics. The processed mixture may be subsequently mixed with thermoplastic polymer.

32 Claims, No Drawings

METHOD OF MELT PROCESSING CROSSLINKED THERMOPLASTIC MATERIAL

BACKGROUND OF THE INVENTION

The present invention relates to the melt processing of crosslinked thermoplastic material, for example, for use in recycling such material.

The use of a thermoplastic material to form an article may facilitate the later recycling of that article. This is because a thermoplastic material by its nature may be repeatedly softened by heat and hardened by cooling. Thus, it is relatively straightforward to recycle a thermoplastic material simply by softening it to the point that is may be processed or blended with virgin plastic material. The use of a thermoplastic material may be contrasted with the use of a thermoset plastic material—which is generally recognized as difficult to recycle. A thermoset material is cured by heat, catalysis, or other chemical means to form an extensive crosslinked network. Because a thermoset generally may not be melted or softened by reheating, it is difficult to blend a thermoset plastic with a virgin plastic material simply by reheating the thermoset plastic.

After a thermoplastic material has been thermoformed, its performance characteristics may be enhanced by crosslinking its polymeric structure to a desired level. Crosslinking of thermoplastic materials is used, for example, in the manufacture of extruded thermoplastic films for food and non-food packaging, thermoplastic insulation for electrical wire and cable, and injection- or blow-molded thermoplastic articles. Chemical crosslinking may be performed through the use of one or more crosslinking agents (e.g., organic peroxides), which may or may not require irradiation for activation. Also crosslinking may also occur by irradiation without the use of a crosslinking agent to facilitate the crosslinking (i.e., "radiation induced crosslinking").

The greater degree to which a thermoplastic material has been modified by crosslinking, the more the crosslinked thermoplastic resin will behave as if it were a thermoset material. Thus, recycling a thermoplastic material that has been crosslinked may be problematic.

SUMMARY OF THE INVENTION

The present invention addresses one or more of the aforementioned problems. A method of recycling plastic comprises forming a mixture comprising: (i) 100 weight parts of crosslinked thermoplastic resin having a given melt flow index of at most about 0.5 g/10 minutes; (ii) from about 0.1 to about 150 weight parts of polymeric resin having an weight-average molecular weight of at least about 2,000 and a melt flow index of at least about 10 times the given melt flow index of the crosslinked thermoplastic resin and a melt flow index of at least about 1.5 g/10 minutes; and (iii) optionally, a given amount of non-crosslinked thermoplastic resin having a melt flow index of less than the melt flow index of the polymeric resin. The mixture is exposed to mechanical shearing energy to create a processed mixture having a melt flow index of at least about 0.8 times $10^X$, where:

$X=(WF_1)\log_{10}(MFI_1)+(WF_2)\log_{10}(MFI_2)+(WF_3)\log_{10}(MFI_3)$;

$WF_1$=(weight of the crosslinked thermoplastic resin)/(weight of the mixture);

$WF_2$=(weight of the polymeric resin)/(weight of the mixture);

$WF_3$=(weight of the non-crosslinked thermoplastic resin)/(weight of the mixture);

$MFI_1$=the melt flow index of the crosslinked thermoplastic resin;

$MFI_2$=the melt flow index of the polymeric resin; and $MFI_3$=the melt flow index of the non-crosslinked polymeric resin.

The processed mixture is subsequently mixed with thermoplastic polymer.

A method of enhancing the melt-processibility of crosslinked plastic comprises forming a mixture comprising: (i) 100 weight parts of crosslinked thermoplastic resin having a given melt flow index of at most about 0.5 g/10 minutes; (ii) from about 0.1 to about 150 weight parts of polymeric resin having a weight-average molecular weight of at least about 2,000 and a melt flow index of at least about 10 times the given melt flow index of the crosslinked thermoplastic resin and a melt flow index of at least about 4 g/10 minutes; and (iii) optionally, a given amount of non-crosslinked thermoplastic resin having a melt flow index of less than the melt flow index of the polymeric resin. The mixture is exposed to to mechanical shearing energy to create a processed mixture having a melt flow index of at least about 0.8 times $10^X$, where "x" is as stated in the preceding paragraph.

Other advantages and features of the invention will be more readily understood and appreciated by reference to the detailed description of the invention.

DETAILED DESCRIPTION OF THE INVENTION

The melt processibility of a crosslinked thermoplastic resin may be enhanced by mixing it with a low viscosity polymeric resin ("diluent resin") having a specified melt flow index ("MFI") relative to the melt flow index of the crosslinked thermoplastic resin, and exposing the mixture to mechanical shearing energy to produce a processed mixture having enhanced melt flow characteristics.

Crosslinked Thermoplastic Resin

"Crosslinked thermoplastic resin" is thermoplastic resin (i.e., one or more thermoplastic polymers) that has crosslinks formed by subjection to a crosslinking treatment or reaction, which may reduce or eliminate the ability of the thermoplastic resin to soften or melt upon reheating and harden or freeze upon cooling, and thus render these characteristics more like those of a thermoset resin than those of the thermoplastic resin before the crosslinking treatment or reaction. Thermoplastic resin that may be crosslinked include that comprising one or more thermoplastic polymers such as polyolefins, polystyrenes, polyurethanes, polyamides, and polyesters.

Polyolefins include ethylene homo- and co-polymers. Ethylene homopolymers include high density polyethylene ("HDPE") and low density polyethylene ("LDPE"). Ethylene copolymers include ethylene/alpha-olefin copolymers ("EAOs"), ethylene/unsaturated ester copolymers, and ethylene/(meth)acrylic acid. ("Copolymer" as used in this application means a polymer derived from two or more types of monomers, and includes terpolymers, etc.)

EAOs are copolymers of ethylene and one or more alpha-olefins, the copolymer having ethylene as the majority mole-percentage content. Preferably, the comonomer includes one or more $C_3$–$C_{20}$ α-olefins, more preferably one or more $C_4$–$C_{12}$ α-olefins, and most preferably one or more $C_4$–$C_8$ α-olefins. Particularly preferred α-olefins include 1-butene, 1-hexene, 1-octene, and mixtures thereof.

EAOs include one or more of the following: 1) medium density polyethylene ("MDPE"), for example having a density of from 0.93 to 0.94 g/cm3; 2) linear medium density polyethylene ("LMDPE"), for example having a density of from 0.926 to 0.94 g/cm3; 3) linear low density polyethylene ("LLDPE"), for example having a density of from 0.915 to 0.930 g/cm3; 4) very-low or ultra-low density polyethylene ("VLDPE" and "ULDPE"), for example having density below 0.915 g/cm3, and 5) homogeneous EAOs. EAOs may have a density of less than about any of the following: 0.925, 0.922, 0.92, 0.917, 0.915, 0.912, 0.91, 0.907, 0.905, 0.903, 0.9, and 0.898 grams/cubic centimeter. Unless otherwise indicated, all densities herein are measured according to ASTM D1505 and expressed in units of g/cc.

The polyethylene polymers may be either heterogeneous or homogeneous. As is known in the art, heterogeneous polymers have a relatively wide variation in molecular weight and composition distribution. Heterogeneous polymers may be prepared with, for example, conventional Ziegler Natta catalysts.

On the other hand, homogeneous polymers are typically prepared using metallocene or other single site-type catalysts. Such single-site catalysts typically have only one type of catalytic site, which is believed to be the basis for the homogeneity of the polymers resulting from the polymerization. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions. Examples of homogeneous polymers include the metallocene-catalyzed linear homogeneous ethylene/alpha-olefin copolymer resins available from the Exxon Chemical Company (Baytown, Tex.) under the EXACT trademark, linear homogeneous ethylene/alpha-olefin copolymer resins available from the Mitsui Petrochemical Corporation under the TAFMER trademark, and long-chain branched, metallocene-catalyzed homogeneous ethylene/alpha-olefin copolymer resins available from the Dow Chemical Company under the AFFINITY trademark.

Ethylene copolymers include ethylene/unsaturated ester copolymer, which is the copolymer of ethylene and one or more unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth) acrylate"), where the esters have from 4 to 12 carbon atoms.

Representative examples of the first ("vinyl ester") group of monomers include vinyl acetate, vinyl propionate, vinyl hexanoate, and vinyl 2-ethylhexanoate. The vinyl ester monomer may have from 4 to 8 carbon atoms, from 4 to 6 carbon atoms, from 4 to 5 carbon atoms, and preferably 4 carbon atoms.

Representative examples of the second ("alkyl (meth) acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and preferably from 4 to 5 carbon atoms.

The unsaturated ester (i.e., vinyl ester or alkyl (meth) acrylate) comonomer content of the ethylene/unsaturated ester copolymer may be at least about any of the following weight %: 2, 4, 6, 8, 10, and 12%; may be at most about any of the following weight %: 24, 22, 20, 18, 16, 14, 12, 10, and 8%; and may range between any two of values stated in this paragraph., for example, from about 4 to about 18 weight %, from about 6 to about 12 weight %, and from about 8 to about 12 weight %, based on the weight of the copolymer. Useful ethylene contents of the ethylene/unsaturated ester copolymer include the following amounts: at least about 82 weight %, at least about 85 weight %, at least about 88 weight %, at most about about 94 weight %, at most about 93 weight %, and at most about 92 weight %, based on the weight of the copolymer.

Representative examples of ethylene/unsaturated ester copolymers include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, and ethylene/vinyl acetate.

Ethylene copolymer includes ethylene/(meth)acrylic acid, which is the copolymer of ethylene and acrylic acid, methacrylic acid, or both.

Barrier components that may be crosslinked include ethylene/vinyl alcohol copolymer ("EVOH") and polyvinyl alcohol ("PVOH"). EVOH may have an ethylene content of between about 20% and 40%, preferably between about 25% and 35%, more preferably about 32% by weight. EVOH may include saponified or hydrolyzed ethylene/vinyl acetate copolymers, such as those having a degree of hydrolysis of at least 50%, preferably of at least 85%.

Representative polyamides include polyamide 6, polyamide 9, polyamide 10, polyamide 11, polyamide 12, polyamide 66, polyamide 610, polyamide 612, polyamide 6I, polyamide 6T, polyamide 69, copolymers made from any of the monomers used to make two or more of the foregoing homopolymers (e.g., copolyamide 6/12, polyamide 12, copolyamide 66/69/6I, copolyamide 66/610, copolyamide 6/66, and copolyamide 6/69), and blends of any of the foregoing homo- and/or copolymers. Polyamide copolymers include: (a) copolyamide 6/12 comprising (i) caprolactam mer in an amount of from about 20 to 80 weight percent (preferably 30 to 70 weight percent, more preferably 40 to 60 weight percent), and (ii) laurolactam mer in an amount of from about 80 to 20 weight percent; and (b) copolyamide 66/69/6I comprising 10 to 50 weight percent hexamethylene adipamide mer (preferably from about 20 to 40 weight percent), 10 to 50 weight percent polyamide 69 mer (preferably from about 20 to 40 weight percent), and 10 to 60 weight percent hexamethylene isophthalamide mer (preferably, from about 10 to 40 weight percent).

Representative polyesters include amorphous (co) polyesters, poly(ethylene/terephthalic acid), and poly (ethylene/naphthalate). Poly(ethylene/terephthalic acid) with at least about 75 mole percent, more preferably at least about 80 mole percent, of its mer units derived from terephthalic acid may be preferred.

The thermoplastic resin may be crosslinked to a desired degree to form the crosslinked thermoplastic resin by methods known to those of skill in the art, for example: (i) by chemical crosslinking through the use of one or more crosslinking agents and exposure to an activating condition such as an effective amount of heat, pressure, irradiation or a combination thereof (i.e., "chemical crosslinking") or (ii) an effective amount of irradiation (e.g., electron beam, X-ray, gamma ray, beta ray) without the use of a crosslinking agent (i.e., "radiation induced crosslinking"). Discussions of crosslinking methods may be found, for example, in U.S. Pat. No. 4,551,380 issued Nov. 5, 1985 to Schoenberg and U.S. Pat. No. 5,928,798 issued Jul. 27, 1999 to Buongiorno et al, each of which is incorporated in its entirety by reference and the Encyclopedia of Polymer Science and Engineering, Vol. 3, pp. 350–449 (John Wiley & Sons 1985), of which the cited portion is incorporated herein by reference.

One method for characterizing the degree of crosslinking that exists in a crosslinked thermoplastic resin is to conduct a "gel content test." The gel content test selects a solvent and conditions that would solubilize the non-crosslinked portion but which is unable to solubilize the crosslinked portion (i.e., "gel") of the thermoplastic resin once it has been crosslinked. The result is expressed as a "percent gel," which is the amount of insoluble (i.e., crosslinked) component over the total weight of crosslinked thermoplastic resin. The quantity of gel formed is primarily a function of the initial distribution of molecular weight fractions and the amount of crosslinking treatment (e.g., irradiation dosage) received.

One method of conducting a gel content test on crosslinked polyethylene thermoplastic resin (i.e., the "toluene extraction gel content test") is to place a 0.4 to 0.5 gram sample (weighed to ±0.1 mg) into an extraction thimble (i.e., a cellulose, single thickness, 22 mm by 65 mm extraction thimble or a polytetrafluoroethylene extraction thimble of similar dimension). Pour approximately 100 ml of ACS reagent grade or equivalent toluene into a 400 ml wide mouth Erlenmeyer flask and add three to six carborundum boiling stones to the flask. Set the flask on a hot plate capable of greater than 100° C. constant temperature. Place the thimble in a borosilicate glass siphon cup and position the siphon cup and a block-tin condenser with copper cover into the flask. Bring the toluene to a boil and adjust the heat to yield a reflux rate of between 2 and 4 drops per second. Reflux for 21 hours, then remove the thimble which contains the gel component. Air dry the gel component for at least two hours, then dry the gel component in a vacuum oven at 50° C. under 25 to 30 psi vacuum for 24 hours. Weigh the gel component on an analytical balance capable of 0.1 mg sensitivity. Calculate the percent gel by the formula: 100* (gel component weight)/(sample weight). The gel component is extracted a second 21 hours to assure complete solubility of all soluble portions. If the amount of gel of the second extraction is more than 3 percent (absolute) less than the amount of gel of the first extraction, subsequent extractions should be run to verify the original results. However, even if no insoluble material (i.e., "gel") remains, the tested plastic material may nevertheless be crosslinked to some extent. Any reference in this application to a percent gel content shall mean the percent gel as determined by the test as outlined in this paragraph, unless otherwise indicated.

The percent gel content of the crosslinked thermoplastic resin may be 0% (i.e., undetectable) or may be at least about any of the following values: 5, 10, 15, 20, 25, 30, 35, 40, 45, 50, 60, 70, 80, 90, and 100%; and may range between any two of the values in this paragraph.

Another method of determining the gel content of polyethylene plastic is set forth by ASTM D 2765-95, which is incorporated herein in its entirety by reference.

Another method for indicating the degree to which a plastic material is crosslinked is to determine its melt flow index in accordance with ASTM D 1238-98, which is incorporated herein in its entirety by reference. The melt flow index of a plastic material generally decreases as the degree of crosslinking increases. Accordingly, the melt flow index of the un-crosslinked thermoplastic resin may be compared to the melt flow index of the same thermoplastic material that has been crosslinked (e.g., by irradiation). The amount of decrease in the melt flow index indicates the amount of crosslinking that has occurred.

Other methods of characterizing the extent of crosslinking are well known to those of skill in the art, and therefore are not discussed here.

The melt flow index of the crosslinked thermoplastic resin may be at most about any of the following values: 0.5, 0.3, 0.1, 0.09, 0.08, 0.07, 0.06, 0.05, 0.04, 0.03, 0.02, 0.01, and 0 (i.e, undetectable) grams/10 minutes; and may also range between any two of those values, measured according to ASTM 1238-98 Condition 190/2.16 kg. Unless indicated otherwise, in this application the term "melt flow index" refers to the amount in grams of a resin that can be forced within 10 minutes through the specified orifice under the weight of 2.16 kg and at a temperature of 190° C., pursuant to ASTM D 1238-98 Condition 190/2.16.

The crosslinked thermoplastic resin may include an amount of any of the polyolefins, polystyrenes, polyurethanes, polyamides, and polyesters identified in this section of at least about 5, 10, 20, 30, 40, 50, 60, 70, 80, 90, and 100 weight percent; may include at most about any of the values set forth in this paragraph; and may range between any two values set forth in this paragraph, each weight percentage being based on the total weight of the crosslinked thermoplastic resin.

The mixture may comprise at least about any of the following amounts of crosslinked thermoplastic resin based on the weight of the mixture: 0.5%, 1%, 2%, 3%, 4%, 5%, 6%, 7%, 8%, 9%, 10%, 20%, 30%, 40%, 50%, 60%, 70%, 80%, 90%, and 100%. Further, the amount of crosslinked thermoplastic resin in the mixture may range between any of the amounts listed in this paragraph, for example, from about 10% to about 90%, from about 70% to about 80%, and so on.

Diluent Resin

A relatively low-viscosity thermoplastic polymeric resin ("diluent resin") is mixed with the crosslinked thermoplastic resin to form the mixture. A "polymeric resin" includes one or more polymers. The diluent resin may be selected to have a melt flow index that is any of: (i) at most the value of about any of the following factors times the melt flow index of the crosslinked thermoplastic resin: 6,000; 5,000; 4,000; 3,000; 2,500; 2,000; 1,500; 1,000; 800; 600; and 500, (ii) at least the value of about any of the following factors times the melt flow index of the crosslinked thermoplastic resin: 10; 15; 20; 25; 30; 35; 40; 45; 50; 60; 70; 80; 90; 100; 150; 200; 250; 300; 400; 500; 600; 800; 1000; 1,500; and 2,000; and (iii) the value between any two of the foregoing factors times the melt flow index of the crosslinked thermoplastic resin, for example, from about 10 to about 6,000 times the melt flow index of the crosslinked thermoplastic resin; from about 40 to about 200 times the melt flow index of the crosslinked thermoplastic resin, and so on.

It is a generally held belief by those of skill in the art that an attempt to extrude two thermoplastics where the higher viscosity thermoplastic has a melt flow index greater than about 10 times the melt flow index of the relatively lower viscosity thermoplastic will result in an inadequate mixing of the two thermoplastics. However, the inventive process of enhancing the melt processiblity of crosslinked thermoplastic resin proceeds contrary to that general belief, by mixing with the crosslinked thermoplastic resin the diluent resin having a melt flow index of at least about 10 times the melt flow index of the crosslinked thermoplastic resin.

The melt flow index of the diluent resin may also be at least about any of the following values (g/10 minutes): 1.5; 2; 2.5; 3; 3.5; 4; 4.5; 5; 5.5; 6; 6.5; 7; 7.5; 8; 8.5; 9; 9.5; 10; 11; 12; 13; 14; 15; 20; 25; 30; 40; 50; 60; 70; 80; 90; 100; 110; 120; 135; 150; 200; 250; 300; 400; 500; 600; 800; 1000; 1,500; 2,000; 2,500; 3,000; 3,500; and 4,000. Further, the melt flow index of the diluent resin may be at most about any of the following values (g/10 minutes): 6,000; 5,000; 4,000; 3,000; 2,500; 2,000; 1,500; 1,000; 800; 600; 500; and 400. Further, the melt flow index of the diluent resin may range between any of the forgoing values in this paragraph, for example, from about 100 to about 6,000 g/10 minutes, from about 200 to about 400 g/10 minutes, and so on.

The diluent resin may have a weight-average molecular weight ($M_w$) of at least about any of the following values: 2,000; 3,000; 4,000; 5,000; 6,000; 7,000; 8,000; 9,000; and 10,000.

Exemplary diluent resins may include any of the polyethylene homo- and co-polymers described above. Useful polyethylene diluent resins may include any of the following: LDPE available from Nova Chemical Corp (Corunna, Ontario) under the NOVAPOL LA-0218-AF trademark, 0.919 density, 2.0 g/10 min MFI (condition 190/2.16); LLDPE available from Exxon Chemicals Corporation (Houston, Tex.) under the ESCORENE LL5100-09 trademark, 0.925 density, 20 g/10 min MFI; LLDPE available from Nova Chemical Corp (Corunna, Ontario) under the SCLAIR 2318 trademark, 0.925 density, 113 g/10 min MFI (Condition 190/2.16); LDPE available from Equistar Chemicals, LP (Houston, Tex.) under the PETROTHENE NA 598-00 trademark, 0.914 g/cc density, 400 g/10 min MFI, viscosity at 150° C. 41,000 cP; LDPE available from Equistar Chemicals, LP (Houston, Tex.) under the PETROTHENE NA 601-04 trademark, 0.902 g/cc density, 2,000 g/10 min MFI, viscosity at 150° C. 8,800 cP; and LDPE available from Equistar Chemicals, LP (Houston, Tex.) under the PETROTHENE NA 605-04 trademark, 0.900 g/cc density, 4,000 g/10 min MFI, viscosity at 150° C. 4,400 cP.

The amount of diluent resin in the mixture may be at least about any of the following values: 0.1, 0.5, 1, 2, 3, 4, 5, 6, 7, 8, 9, 10, 15, 20, 25, 30, 35, 40, 45, 50, 55, 60, 65, 70, 75, and 80 weight parts diluent resin to 100 weight parts crosslinked thermoplastic resin; may be at most about any of the following values: 150, 140, 130, 120, 110, 100, 95, 90, 85, 80, 75, 70, 65, 60, 55, 50, 45, 40, 35, 30, 25, 20, 15, 10, and 5 weight parts diluent resin to 100 weight parts crosslinked thermoplastic resin; and may range between any two of the values in this paragraph.

The weight percentage of the combined weight of the crosslinked thermoplastic resin and the diluent resin relative to the weight of the mixture may be at least about any of the following values: 5, 10, 15, 20, 25, 30, 35, 40, 45, 50, 55, 60, 65, 70, 75, 80, 85, 90, 95, 97, 99, and 100 weight percent; may be at most about any of the values in this paragraph; and may range between any two values in this paragraph.

Non-Crosslinked Thermoplastic Resin

The mixture may comprise non-crosslinked thermoplastic resin having a melt flow index of less than the melt flow index of the diluent resin. The melt flow index of the non-crosslinked thermoplastic resin may be less than about any of the following values: 10, 9, 8, 7, 6, 5, 4, 3.5, 3, 2.5, 2, 1.9, 1.8, 1.7, 1.6, and 1.5 g/10 minutes.

The non-crosslinked thermoplastic resin may comprise any of the polyolefins, polystyrenes, polyurethanes, polyamides, and polyesters described above as crosslinkable—only without the crosslinks that may be formed by exposure to crosslinking conditions. Non-crosslinked thermoplastic resin may comprise propylene homo- and co-polymers, such as propylene/ethylene copolymers ("EPC"), which are copolymers of propylene and ethylene having a majority weight % content of propylene, such as those having an ethylene comonomer content of less than 10%, preferably less than 6%, and more preferably from about 2% to 6% by weight. As is known in the art, polypropylene does not typically crosslink by radiation induced crosslinking because the radiation tends to induce polymeric chain scission.

The non-crosslinked thermoplastic resin may comprise vinylidene chloride polymer ("PVdC"). PVdC refers to a vinylidene chloride-containing polymer or copolymer—that is, a polymer that includes monomer units derived from vinylidene chloride ($CH_2=CCl_2$) and also, optionally, monomer units derived from one or more of vinyl chloride, styrene, vinyl acetate, acrylonitrile, and $C_1–C_{12}$ alkyl esters of (meth)acrylic acid (e.g., methyl acrylate, butyl acrylate, methyl methacrylate). As used herein, "(meth)acrylic acid" refers to both acrylic acid and/or methacrylic acid; and "(meth)acrylate" refers to both acrylate and methacrylate. Examples of PVdC include one or more of the following: vinylidene chloride homopolymer, vinylidene chloride/vinyl chloride copolymer ("VDC/VC"), vinylidene chloride/methyl acrylate copolymer, vinylidene chloride/ethyl acrylate copolymer, vinylidene chloride/ethyl methacrylate copolymer, vinylidene chloride/methyl methacrylate copolymer, vinylidene chloride/butyl acrylate copolymer, vinylidene chloride/styrene copolymer, vinylidene chloride/acrylonitrile copolymer, and vinylidene chloride/vinyl acetate copolymer. PVdC includes that having between 75 and 95 weight % vinylidene chloride monomer; and may from about 5 to about 25 weight %, from about 10 to about 22 weight %, and from about 15 to about 20 weight % comonomer with the vinylidene chloride monomer.

As is known in the art, it is advisable not to irradiate a PVdC component due to the likelihood of generating hydrogen chloride or other undesirable byproducts. As is also known, PVdC blends may include effective amounts of thermal stabilizers and lubricating processing aids or plasticizers.

The weight percent of the non-crosslinked thermoplastic resin—or any component of the non-crosslinked thermoplastic resin—may be at most about any of the following values based on the weight of the mixture: 95, 90, 85, 80, 75, 70, 65, 60, 55, 50, 45, 40, 35, 30, 25, 20, 15, 10, 5, 4, 3, 2, 1, and 0 weight percent; may be at least about any of the preceding values; and may range between any two of the preceding values. Further, the mixture may be free from non-crosslinked thermoplastic resin having a melt flow index of less than the melt flow index of the diluent resin.

Other Components

The mixture may also comprise other components useful in plastic formulations, such as additives, processing aids, antiblock agents, antislip agents, pigments, colorants, plasticizers, and stabilizers, present in effective amounts.

Obtaining and Processing the Crosslinked Thermoplastic Resin

The crosslinked thermoplastic resin may be provided as a component of a plastic material, such as scrap plastic material, that comprises crosslinked thermoplastic resin. The plastic material may also comprise the optional non-crosslinked thermoplastic resin. Scrap plastic material may be generated during any of a number of plastic processing operations, such as plastic film extrusion, injection molding, compression molding, blow molding, and foaming. For example, scrap plastic material may be generated during the manufacture of plastic packaging film when trimming film edges or roll ends, from film breakages, by filling custom orders requesting special widths, or by production of rolls that are out of specification.

To facilitate processing, the plastic material may be reduced in size, for example by any of grinding, compression, densification, and commutation into pellets, flakes, chunks, granules, or powder. For example, where the plastic material is provided in a film form (e.g., where the plastic material is provided as scraps of film), it may be reduced in size such that the length and width dimensions are each less than about any of the following: 12 inches, 10 inches, 5 inches, 3 inches, 2 inches, and 1 inch; are each greater than any of the preceding values; or range between any two of the preceding values. The plastic material may be reduced in size so that the average particle size may be less than about any of the following values: 1 inch by 1/16 inch granulate and 30 mesh granulate. The plastic material may be processed into pellets (e.g., cylindrical pellets and round pellets) that are of a size commonly available from the plastic industry, for example, having an average diameter of from about 0.03 to about 0.25 inches and/or cut lengths of from 0.03 to about 0.25 inches; and may have a granulate particle size ranging between about 30 mesh and 0.25 inches.

If the plastic material or mixture comprises PVdC, then it may be advantageous to add a neutralizing basic component to neutralize the hydrogen chloride that may be generated by the potential degradation of the PVdC during the processing of the plastic material. Commercial PVdC is typically formulated to withstand the expected processing temperatures for PVdC resins of approximately 320° F. or less; however, such PVdC may not be stable at the 450° F. or greater temperatures that may occur during the processing of the mixtures of the present invention. At such temperatures, PVdC may thermally degrade to generate the acidic byproduct hydrogen chloride.

Accordingly, an acid scavenging (i.e., acid neutralizing) component may be added to the mixture comprising PVdC. Such neutralizing component may react in-situ with the acidic, hydrogen chloride byproduct during the processing of the mixture; and may also thermally stabilize the mixture during subsequent processing operations. Useful acid neutralizing components include any basic compound having a pH of greater than about 7 that also may react with hydrogen chloride, for example: 1) inorganic carbonates derived from Group I and II metals, such as sodium bicarbonate, sodium carbonate, and calcium carbonate, which react with hydrogen chloride to yield water, carbon dioxide, and an inert salt such as sodium (or calcium) chloride, 2) inorganic minerals (e.g., hydratalcite) that are composed of a mixture of basic carbonate salts, and 3) any chemical that is known to react with hydrogen chloride.

The mixture may be formed by feeding the crosslinked thermoplastic resin, the diluent resin, and the optional non-crosslinked thermoplastic resin to an extruder. The components may be premixed before feeding to the extruder, may be fed separately to the extruder, or may be fed as a composite material comprising the crosslinked and non-crosslinked thermoplastic resins, for example, a scrap plastic material comprising these components.

The mixture is exposed to mechanical shearing energy to form the processed mixture. The mechanical shearing energy may be provided by the extruder. It is believed that the mechanical shearing energy may cause at least some of the crosslink bonds to break, as discussed below. The extruder may be a single stage or a multistage extruder, and/or a single-, twin-, or mult-screw extruder. The extruder performs several functions. It melts or softens the feed components into a molten mass (i.e., "melt"). The extruder also mixes and uniformly disperses the feed components, for example: 1) the crosslinked thermoplastic resin, 2) the diluent resin, and 3) any other optional non-crosslinked thermoplastic resin or additives fed to the extruder. The extruder may also force trapped air from the melt.

The extruder may also be equipped with a cross-head extruder (i.e., "secondary extruder") to assist with pelletizing the melt. A cross-head extruder provides several benefits to the processing operation. First, a cross-head extruder increases residence time by adding internal volume to the processing equipment. Second, the cross-head extruder may remove heat from the melt to facilitate the downstream shaping, cooling and cutting of strands into pellets. Third, the cross-head extruder may generate the pressure required to force the melt out of a shaping, restrictive die. Thus, the cross-head extruder allows the primary extruder portion to better focus its energy or power toward increased overall production rates. Inclusion of a cross-head extruder may increase the production rate (i.e., extruder output rate) by up to about 50%.

A typical extruder comprises in sequential order: 1) a feed zone for intake of the feed components near the beginning of the screw, 2) a melt or "flux" zone, which melts, mixes, and kneads or shears the molten material, 3) a metering zone into which further material or additives may be introduced or a vacuum venting of volatiles may be accomplished, and (4) a final metering zone which compresses the melt, generating the pressures required to force the melt to exit from a restrictive, shaping die.

A co-rotating, intermeshing twin screw extruder affords customized screw designs to be assembled using combinations of segmented or individual elements. The elements of the extruder may vary in combined axial length along the drive shaft and are described using an L/D ratio defined as the axial length divided by the barrel internal diameter. Elements include "feed screws" and "kneaders." Feed screws are combined in a relatively long section of continuous flights that resemble machine screws. The combined length of feed screws may have an L/D of at least about any of the following values: 0.4, 1.0, 2.0, 3.6, and 4.5. Just as a machine screw has either right hand or left hand threads, so too does a feed screw have a pitch that conveys material in either a forward direction (a "forward feed screw") or in a reverse direction (a "reverse feed screw").

A "kneader" is a relatively short, discrete mixing element that has the same cross sectional profile as a feed screws and may have an L/D of at least about any of the following values: 0.15, 0.2, 0.25, 0.3, and 0.45. An individual kneader does not transport material by itself, but has a specific function only as assembled in a specific axial orientation along the drive shaft. Relative to the axial position of its preceding kneader, a kneader may be oriented in a forward axial orientation (a "forward kneader" having a forward conveying function), a neutral or perpendicular axial orientation (a "neutral kneader" having no conveying function but offering intensive mixing), or a reverse axial orientation (a "reverse kneader" having a reverse conveying or back pumping function), as is known in the extrusion art.

The flux zone may contain kneaders or "mixing elements" to effect the transport, mixing, melting, shearing, and compression functions of the extruder. In the reverse orientation, a kneader performs the same function as a reverse feed screw, which creates back pressure and back flow within the flux zone of the extruder, creating a reverse flow zone. Since the degree of fill increases to 100% within this reverse flow zone, the preceding forward feed screw or forward kneader must overcome this resistance. This reverse flow zone provides increased residence time and imparts shear stresses to the material being transported within the extruder. Thus, the elements that comprise the flux zone enhance the mixing and heating of the melt. Multiple reverse flow or flux zones may be used in an extruder configuration, each reverse flow zone having its own length. The "fluxing ratio" is the total length of the elements that comprise the reverse flow or flux zone of the extruder (i.e., the length of the "fluxing zone") divided by the internal diameter of the barrel. The fluxing ratio may be zero (i.e., no reverse elements used); may be at least about any of the following values: 0.25, 0.5, 0.75, 1, 1.25, 1.5, and 1.75; may be at most about any of the following values: 0.75, 1, 1.25, 1.5, 1.75, and 2; and may range between any of the forgoing values. Generally, as the fluxing ratio increases, the melt flow index of the extrudate increases; however, productivity decreases and the extrudate temperature may rise to an undesired or unacceptable level. In extruding the mixture, it is generally considered helpful if the temperature of the extrudate does not rise above 600° F., which is the temperature at which thermal scission of the carbon-carbon bond in the polymer "backbone" chain.

The "productivity" of an extruder or extrusion process may be characterized as the ratio of the extruder output over the power consumption needed to produce that output. If all other variables are equal, then a higher productivity is desirable for commercial operation, since there would be a greater output for a given power consumption. The productivity may be at least about any of the following values: 3, 3.5, 4, 4.5, 5, 5.5, 6, 7, 8, and 9 lbs/hr/Hp, and may range between any two of those values.

The processing energy is the reciprocal of the productivity. The processing energy may indicate the amount of mechanical energy imparted to the mixture during processing—that is, all other variables being equal, a higher processing energy indicates that the mixture is exposed to greater shear forces and shear stresses during extrusion. The processing energy may be at most about any of the following values: 0.15, 0.2, 0.25, 0.3, 0.35, 0.4, 0.45, 0.5, and 0.55 Kw-hour/kg; may be less than about any of the values in this paragraph; and may range between about any two values in this paragraph. It is believed that the exposure of the mixture to shearing forces and shearing stresses during extrusion and mixing causes at least some of the crosslink bonds to break, thereby decreasing the viscosity of the mixture (i.e., increasing the melt flow index).

The melt flow index of a mixture may not be accurately predicted by using a simple "linear rule of mixtures," which in the case of melt flow indices would sum the product of the weight fraction of each resin times its melt flow index. However, it is known to those of skill in the art that the melt viscosity of a mixture may be predicted by the "logarithmic rule of mixtures," which in the case of melt viscosity is:

$$\text{Log}(\eta_{mixture}) = W_1[\text{Log}(\eta_1)] + W_2[\text{Log}(\eta_2)] + \ldots W_n[\text{Log}(\eta_n)]$$

where $\eta_{mixture}$ is the melt viscosity of the mixed components 1 through n; $W_1$, $W_2$, and $W_n$ are the weight fractions of components 1, 2 and n, respectively; $\eta_1$, $\eta_2$, and $\eta_n$ are the melt viscosities of components 1, 2 and n, respectively; and n is an integer greater than 1.

From this relationship may be derived the following "logarithmic rule of mixtures for melt flow index":

$$\text{Log}(MFI_{mixture}/d_{mixture}) = W_1[\text{Log}(MFI_1/d_1)] + W_2[\text{Log}(MFI_2/d_2)] + \ldots W_n[\text{Log}(MFI_n/d_n)]$$

where $MFI_{mixture}$ is the melt flow index of the mixed components 1 through n; $d_{mixture}$ is the melt density of the mixed components 1 through n; $MFI_1$, $MFI_2$, and $MFI_n$ are the melt flow indices of components 1, 2 and n, respectively; $d_1$, $d_2$, and $d_n$ are the melt densities of components 1, 2 and n, respectively; and n is an integer greater than 1. This logarithmic rule of mixtures for melt flow index may be derived from the logarithmic rule of mixtures for melt viscosities by algebraically substituting the two fundamental rheological equations for viscosity and for shear rate expressed using melt flow index (MFI) as the volumetric flow variable and also by applying the power law to describe viscosity as a function of shear rate.

The logarithmic rule of mixtures for melt flow index may be difficult to use in practice because of the difficulty in measuring melt densities for polymers at elevated temperatures. Further, the density of mixtures may not follow the linear rule of mixtures. However, if it is assumed that the melt densities of the mixture and each component are identical (i.e., $d_{mixture} = d_1 = d_2 = d_n$), then the equation may be simplified so that the melt flow index of the mixture may be predicted by the following:

$$\text{Log}(MFI_{mixture}) = W_1[\text{Log}(MFI_1)] + W_2[\text{Log}(MFI_2)] + \ldots W_n[\text{Log}(MFI_n)]$$

namely, the "MFI Mixture Equation." Accordingly, the "calculated MFI" may be determined by:

$$\text{Calculated } MFI = y10^X$$

where $$X = W_1[\text{Log}(MFI_1)] + W_2[\text{Log}(MFI_2)] + \ldots W_n[\text{Log}(MFI_n)].$$

However, it has been found that in some ranges of weight fractions of components, the MFI Mixture Equation overestimates the MFI of the mixture as a result of the above discussed simplifying assumption. The extent of the overestimation is not linear with respect to weight fraction in the mixture but is parabolic over the range of weight fraction for the mixtures. It has been found, for example, that for a resin mixture where the weight fraction of the lowest viscosity resin is 0.4, the actual MFI may be about 80% of the calculated MFI for the mixture. Where the weight fraction of the lowest viscosity resin is 0.2, the actual MFI may be about 90% of the calculated MFI for the mixture.

The "calculated MFI" as described above predicts the MFI resulting from complete mixing of the components. Because of the overestimation effect discussed above, an MFI of the processed mixture that is less than about 80% of the calculated MFI for the mixture—that is, a ratio of actual MFI for the processed mixture to calculated MFI for the mixture of less than about 0.8—indicates that the processed mixture may not have mixed well under the relative physical properties of the components, such as viscosity, and the processing conditions. For example, if the melt flow index of the diluent resin is greater than about 6,000 times the melt flow index of the crosslinked thermoplastic resin, then it may be difficult to produce a well mixed processed mixture.

It is believed that for these systems, the diluent resin may be too "slippery" for effective mixture extrusion.

The actual melt flow index for the processed mixture may be at least about any one of the following factors—0.8, 0.85, 0.9, 0.95, 1, 1.05, 1.1, 1.15, and 1.2—times the calculated MFI. Such a relationship indicates that the processed mixture may have been exposed to mixing conditions causing enhancement in the melt flow index, for example by breaking at least some of the crosslinks of the crosslinked thermoplastic resin.

The melt flow index for the processed mixture may be at least about any of the following values: 0.15, 0.2, 0.25, 0.3, 0.35, 0.4, 0.45, 0.5, 0.55, 0.6, 0.7, 0.8, 0.9, 1, 1.5, 2, 2.5, 3, 3.5, 4, 5, 6, 7, 8, 9, and 10 g/10 minutes.

Using and Recycling the Processed Mixture

The processed mixture may be formed into films or other articles, for example by using a desired plastics processing operation, such as extrusion (e.g., film extrusion), injection molding, compression molding, blow molding, and foam extrusion. These processes are well known in the art, and are discussed, for example, in Berins, Plastics Engineering Handbook of the Society of Plastics Industry, Inc., pp. 79–179, 341–441, and 541–615 (Van Nostrand Reinhold 1991) and Rosato, Extruding Plastics, pp. 1–276, 305–372, 552–592, 631–645, and 663–672 (Chapman & Hall 1998), for which the cited pages of both are incorporated herein by reference. Foam extrusion is also discussed by U.S. patent application Ser. No. 399,680 filed Mar. 7, 1995 by Havens et al entitled "Method of Recycling Polymer Materials and Sheet Article Made Thereby," published Sep. 12, 1996 as International Patent Application No. PCT/US96/02987 and International Publication No. WO 96/27485, each of which is incorporated herein in its entirety. If it is desired to directly process the processed extrudate into a foamed extrudate, then a foaming (i.e., blowing) agent may be introduced into the extruder while forming the processed mixture, for example, injected into the melt near the end of the primary extruder. If the processed mixture is to be injection molded, then it may be useful for the melt flow index of the processed mixture to range from any of the following: about 2 to about 35, about 7 to about 35, greater than about 4, greater than about 5, greater than about 6, and greater than about 7 g/10 minutes. If the processed mixture is to be blow molded, then it may be useful for the melt flow index of the processed mixture to range from about 1 to about 4 g/10 minutes.

The processed mixture may be pelletized or granulated for ease of storage and shipment for subsequent use. The processed mixture may be a feed component that is mixed with additional thermoplastic polymer before or as part of subsequent plastic processing operation, such as blending, extrusion (e.g., film extrusion), injection molding, compression molding, blow molding, and foam extrusion, which are discussed above. In this use, the processed mixture may be considered a thermoplastic material that has been conditioned for recycling use in the subsequent plastic processing operation, such as any of those plastics processing operations mentioned in this application. The processed mixture may be incorporated into the subsequent processing operation by at least about any of the following weight percentages: 3, 6, 9, 10, 15, 20, 25, 30, 35, 40, 45, 50, 55, 60, 65, 70, 75, 80, 85, 90, 95, and 100%, based on the total weight of the plastic product formed by the subsequent plastic processing operation.

The following examples are presented for the purpose of further illustrating and explaining the present invention and are not to be taken as limiting in any regard. Unless otherwise indicated, all parts and percentages are by weight.

EXAMPLES 1–12

Scrap plastic material was recovered and processed into pellets having an average size of 0.75 by 0.75 inches. The scrap plastic material was a coextruded three-layer plastic shrink film containing 74% LLDPE, 13% LMDPE, and 12.4% EVA. The first and third outer film layers had similar compositions, each including LLDPE, LMDPE, and EVA. The second "core" film layer included LLDPE. The entire film structure had been irradiated at 2.3 to 3.0 Mrads to effect crosslinking. Before irradiation, the film is believed to have had an melt flow index measured according to ASTM 1238-98 Condition 190/2.16 of about 1 g/10 minutes. The scrap plastic material (i.e., "crosslinked thermoplastic resin") had a melt flow index of 0.06 g/10 minutes under the same conditions. The gel content of the scrap plastic film was undetectable under the "toluene extraction gel content test" conditions discussed above; however, the significant change in melt flow index characteristics of the film before and after irradiation indicated the effect and extent of crosslinking. This shrink film is described in U.S. Pat. Nos. 4,551,380 and 4,643,943.

The scrap plastic material was fed to a twin screw, co-rotating, two-stage extruder (Readco Corporation 2-Inch Lab Extruder) having a 2-inch internal diameter barrel and an overall length to internal diameter ratio of 8.75. The first stage of the extruder was configured with forward feed screws and kneaders oriented in a forward axial rotation to convey material downstream along the extruder length. There was a 2-inch long connect section of a forward feed screw between the first and second stages. The second stage or the flux zone of the extruder utilized an initial section of four kneaders configured in a reverse axial rotation with each kneader having a 0.5-inch length to form a "fluxing ratio" of 1.0 (i.e., 2.0 inches total length of kneaders/2.0 inches barrel diameter). The screw used four neutral perpendicular) mixing elements downstream from the fluxing zone. The extruder operated at 250 rpm. The barrel was heated to maintain a barrel temperature of 450° F. The extruder operated at the other conditions show in Table 1. The extrudate temperature was measured by a needle pyrometer positioned to measure the temperature of the center of the extrudate stream.

The amount of low-viscosity polymeric resin ("diluent resin") shown in Table 1 was also fed to the feed zone of the extruder for each of the examples and comparisons. These diluents are set forth in Table 2. The melt flow index of each extrudate is shown in Table 1.

The "calculated MFI" refers to the melt flow index calculated by the MFI Mixture Equation as discussed above.

TABLE 1

| | Comparative/Example No.: | | | | | | | | | | | | | | |
|---|---|---|---|---|---|---|---|---|---|---|---|---|---|---|---|
| | C1 | E1 | E2 | E3 | E4 | E5 | E6 | E7 | E8 | E9 | E10 | E11 | E12 | C2 | C3 |
| Diluent Resin Amount (wt parts/100 wt parts Crosslinked Thermoplastic Resin) | 0 | 11.1 | 25.0 | 11.1 | 25.0 | 42.9 | 66.7 | 11.1 | 25.0 | 42.9 | 66.7 | 11.1 | 25.0 | 42.9 | 66.7 |
| Diluent Resin MFI (g/10 minutes; 190° C., 2.16 kg) | — | 2 | 2 | 20 | 20 | 20 | 20 | 99.5 | 99.5 | 99.5 | 99.5 | 392 | 392 | 392 | 392 |
| Ratio Diluent Resin MFI to Crosslinked Thermoplastic Resin MFI | — | 33 | 33 | 333 | 333 | 333 | 333 | 1658 | 1658 | 1658 | 1658 | 6533 | 6533 | 6533 | 6533 |
| Extrudate MFI (g/10 minutes; 190° C., 2.16 kg) | 0.17 | 0.19 | 0.19 | 0.25 | 0.31 | 0.55 | 0.75 | 0.22 | 0.4 | 0.66 | 1.5 | 0.22 | 0.33 | 0.51 | 1.57 |
| Ratio of Extrudate MFI to Mixture Calculated MFI | 2.83 | 2.23 | 1.57 | 2.33 | 1.62 | 1.6 | 1.22 | 1.75 | 1.51 | 1.19 | 1.29 | 1.52 | 0.95 | 0.61 | 0.78 |
| Output Rate (lbs/hr) | 20.6 | 22.9 | 22.8 | 23.0 | 23.7 | 28.9 | 31.0 | 22.5 | 33.6 | 33.0 | 32.0 | 27.3 | 29.3 | 34.2 | 48.6 |
| Extrudate Temperature (° F.) | 601 | 596 | 575 | 586 | 575 | 560 | 549 | 575 | 545 | 548 | 532 | 551 | 560 | 532 | 531 |
| Power (horsepower) | 5.1 | 5.0 | 5.3 | 5.3 | 5.1 | 5.1 | 5.2 | 5.05 | 5.15 | 5.3 | 5.0 | 5.5 | 5.55 | 5.3 | 5.4 |
| Productivity (lbs/hr/Hp) | 4.04 | 4.57 | 4.31 | 4.35 | 4.64 | 5.67 | 5.96 | 4.46 | 6.52 | 6.23 | 6.40 | 4.96 | 5.28 | 6.45 | 9.00 |
| Process Energy (Kw-hr/kg) | 0.36 | 0.32 | 0.34 | 0.34 | 0.31 | 0.26 | 0.24 | 0.32 | 0.22 | 0.23 | 0.23 | 0.29 | 0.28 | 0.23 | 0.16 |

TABLE 2

| Melt Flow Index of Diluent Resin Shown in Table 1. | Description |
|---|---|
| 2 g/10 minutes | LDPE from Nova Chemical Corp under the NOVAPOL LA0218AF trademark, 0.919 density |
| 20 g/10 minutes | LLDPE from Exxon Chemicals Corporation under the ESCORENE LL5100-09 trademark, 0.925 density |
| 99.5 g/10 minutes | LLDPE from Nova Chemical Corp under the SCLAIR 2318 trademark, 0.925 density, supplier-reported MFI of 113 g/10 min Condition 190/2.16 |
| 392 g/10 minutes | LDPE from Equistar Chemicals, LP under the PETROTHENE NA 598-00 trademark, 0.914 g/cc density, supplier-reported MFI of 400 g/10 min Condition 190/2.16 |

COMPARISONS

The relatives amount of "higher viscosity" LLDPE having a melt flow index of 4.58 g/10 minutes and a density of 0.925 (supplied by Nova Chemical Corporation under the tradename SCLAIR 8107) shown in Table 3 were fed to the feed zone of the same extruder having the same configuration as set forth above with respect to Examples 1–12. The extruder operated at 250 rpm with a barrel temperature of 450° F.

The relative amounts of additional "lower viscosity" LLDPE having the MFI shown in Table 3 were also fed to the feed zone of the extruder for each of the comparisons. The melt flow index of the resulting extrudate is shown in Table 3 along with the "calculated MFI" predicted by the "rule of mixtures." The data shown in Table 3 demonstrates the basis for the belief in the industry that an attempt to mix (i.e., extrude) two thermoplastics where the higher viscosity thermoplastic has a melt flow index greater than about 10 times the relatively lower viscosity thermoplastic will result in an inadequate mixing of the two thermoplastics. This is shown by Comparisons 9–16, where the ratio of the actual melt flow index of the extrudate to the calculated melt flow index for the extrudate is significantly less than one (e.g., less than 0.8) and where the ratio of higher viscosity thermoplastic to the relatively lower viscosity thermoplastic is greater than 10.

TABLE 3

| | Comparative No.: | | | | | | | | | | | | |
|---|---|---|---|---|---|---|---|---|---|---|---|---|---|
| | C4 | C5 | C6 | C7 | C8 | C9 | C10 | C11 | C12 | C13 | C14 | C15 | C16 |
| Amount of higher viscosity LLDPE (wt parts/100 wt parts lower viscosity LLDPE) | 0 | 25.0 | 66.7 | 150.0 | 11.1 | 25.0 | 66.7 | 11.1 | 25.0 | 66.7 | 11.1 | 25.0 | 66.7 |
| Melt Flow Index of higher viscosity LLDPE (g/10 minutes; 190° C., 2.16 kg) | — | 43.9 | 43.9 | 43.9 | 110 | 110 | 110 | 398 | 398 | 398 | 2000 | 2000 | 2000 |
| Ratio MFI of Higher Viscosity LLDPE to MFI of Lower Viscosity LLDPE | — | 10 | 10 | 10 | 24 | 24 | 24 | 87 | 87 | 87 | 437 | 437 | 437 |
| Melt Flow Index of Extrudate (g/10 minutes; 190° C., 2.16 kg) | 4.43 | 6.74 | 10 | 15.4 | 5.75 | 6.96 | 11.8 | 5.4 | 7.23 | 12.9 | 6.26 | 8.11 | 17.3 |
| Ratio of Actual MFI of | 0.97 | 0.94 | 0.88 | 0.87 | 0.91 | 0.80 | 0.72 | 0.75 | 0.65 | 0.47 | 0.74 | 0.52 | 0.33 |

TABLE 3-continued

| | Comparative No.: | | | | | | | | | | | | |
|---|---|---|---|---|---|---|---|---|---|---|---|---|---|
| | C4 | C5 | C6 | C7 | C8 | C9 | C10 | C11 | C12 | C13 | C14 | C15 | C16 |
| Extrudate to Calculated MFI of Mixture | | | | | | | | | | | | | |
| Output Rate (lbs/hr) | 35.4 | 46.13 | 53.2 | 60.14 | 49 | 54 | 65.44 | 48.5 | 48.46 | 60.16 | 45.3 | 54.96 | 68.47 |
| Power (horsepower) | 5.25 | 5.5 | 5.35 | 5.35 | 5.5 | 5.25 | 5.35 | 5.55 | 4.85 | 4.9 | 5.25 | 5.35 | 3.7 |
| Productivity (lbs/hr/Hp) | 6.74 | 8.39 | 9.94 | 11.24 | 8.91 | 10.29 | 12.23 | 8.74 | 9.99 | 12.28 | 8.63 | 10.27 | 18.51 |
| Process Energy (Kw-hr/kg) | 0.22 | 0.17 | 0.15 | 0.13 | 0.16 | 0.14 | 0.12 | 0.17 | 0.14 | 0.12 | 0.17 | 0.14 | 0.07 |

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated.

What is claimed is:

1. A method of recycling plastic comprising:
    forming a mixture comprising:
        (i) 100 weight parts of crosslinked thermoplastic resin having a given melt flow index of at most about 0.5 g/10 minutes;
        (ii) from about 0.1 to about 150 weight parts of polymeric resin having an weight-average molecular weight of at least about 2,000 and a melt flow index of at least about 10 times the given melt flow index of the crosslinked thermoplastic resin and a melt flow index of at least about 1.5 g/10 minutes; and
        (iii) optionally, a given amount of non-crosslinked thermoplastic resin having a melt flow index of less than the melt flow index of the polymeric resin; and
    exposing the mixture to mechanical shearing energy to create a processed mixture having a melt flow index of at least about 0.8 times $10^X$, where:
    $X = (WF_1)\log_{10}(MFI_1) + (WF_2)\log_{10}(MFI_2) + (WF_3)\log_{10}(MFI_3)$;
    $WF_1$ = (weight of the crosslinked thermoplastic resin)/(weight of the mixture);
    $WF_2$ = (weight of the polymeric resin)/(weight of the mixture);
    $WF_3$ = (weight of the non-crosslinked thermoplastic resin)/(weight of the mixture);
    $MFI_1$ = the melt flow index of the crosslinked thermoplastic resin;
    $MFI_2$ = the melt flow index of the polymeric resin; and
    $MFI_3$ = the melt flow index of the non-crosslinked polymeric resin; and
    subsequently mixing the processed mixture with thermoplastic polymer, wherein all melt flow indices are in grams/10 minutes and measured according to ASTM 1238-98 Condition 190/2.16.

2. The method of claim 1 wherein the processed mixture has a melt flow index of at least about 0.9 times $10^X$.

3. The method of claim 1 wherein the processed mixture has a melt flow index of at least about $10^X$.

4. The method of claim 1 further comprising melt extruding the processed mixture with the thermoplastic polymer to form a plastic product.

5. The plastic product formed by the method of claim 4.

6. The method of claim 5 wherein the plastic product comprises at least about 10 weight % of the processed mixture, based on the weight of the plastic product.

7. The method of claim 1 further comprising foam extruding the processed mixture with the thermoplastic polymer to form a plastic product.

8. The method of claim 7 wherein the plastic product comprises at least about 10 weight % of the processed mixture, based on the weight of the plastic product.

9. The method of claim 7 wherein the plastic product comprises at least about 30 weight % of the processed mixture, based on the weight of the plastic product.

10. The plastic product formed by the method of claim 7.

11. The method of claim 1 further comprising injection molding the processed mixture with the thermoplastic polymer to form a plastic product.

12. The plastic product formed by the method of claim 11.

13. The method of claim 1 wherein the crosslinked thermoplastic resin includes a radiation-induced crosslinked thermoplastic resin.

14. The method of claim 1 wherein the crosslinked thermoplastic resin includes a chemically crosslinked thermoplastic resin.

15. The method of claim 1 wherein the crosslinked thermoplastic resin includes one or more crosslinked polyethylene polymers.

16. The method of claim 1 wherein the crosslinked thermoplastic resin comprises from about 40 to about 90 weight % LLDPE, from about 5 to about 20 weight % LMDPE, and from about 5 to about 20 weight % EVA.

17. The method of claim 1 wherein the percent gel content of the crosslinked thermoplastic resin is undetectable under the toluene extraction gel content test.

18. The method of claim 1 wherein the percent gel content of the crosslinked thermoplastic resin measured according to the toluene extraction gel content test ranges from about 15 weight % to about 50 weight %.

19. The method of claim 1 wherein the melt flow index of the crosslinked thermoplastic resin ranges from undetectable to about 0.3 g/10 minutes.

20. The method of claim 1 wherein the mixture comprises at least about 60 weight % crosslinked thermoplastic resin.

21. The method of claim 1 wherein the melt flow index of the polymeric resin is from about 25 to about 2,500 times the given melt flow index of the crosslinked thermoplastic resin.

22. The method of claim 1 wherein the melt flow index of the polymeric resin ranges between about 100 and 2,500 g/10 minutes.

23. The method of claim 1 wherein the amount of the polymeric resin ranges from about 10 to about 70 weight parts.

24. The method of claim 1 wherein the mixture comprises at least about 50 weight % of the combined weight of the crosslinked thermoplastic resin and the polymeric resin, based on the total weight of the mixture.

25. The method of claim 1 wherein the mixture comprises from about 20 to about 70 weight percent of the non-crosslinked thermoplastic resin.

26. The method of claim 25 wherein the non-crosslinked thermoplastic resin comprises PVdC.

27. The method of claim 1 wherein the crosslinked thermoplastic mixture comprises scrap plastic material.

28. The method of claim 1 wherein the mixture is exposed to a processing energy of from about 0.15 to about 0.4 Kw-hours/kg.

29. The method of claim 1 wherein the melt flow index of the processed mixture is at least about 1 g/10 minutes.

30. The method of claim 1 wherein the melt flow index of the processed mixture is at least about 2 g/10 minutes.

31. A method of enhancing the melt-processibility of crosslinked plastic, the method comprising:
   forming a mixture comprising:
   (i) 100 weight parts of crosslinked thermoplastic resin having a given melt flow index of at most about 0.5 g/10 minutes;
   (ii) from about 0.1 to about 150 weight parts of polymeric resin having a weight-average molecular weight of at least about 2,000 and a melt flow index of at least about 10 times the given melt flow index of the crosslinked thermoplastic resin and a melt flow index of at least about 4 g/10 minutes; and
   (iii) optionally, a given amount of non-crosslinked thermoplastic resin having a melt flow index of less than the melt flow index of the polymeric resin; and exposing the mixture to mechanical shearing energy to create a processed mixture having a melt flow index of at least about 0.8 times $10^x$, where:

$X=(WF_1)\log_{10}(MFI_1)+(WF_2)\log_{10}(MFI_2)+(WF_3)\log_{10}(MFI_3)$;

$WF_1$=(weight of the crosslinked thermoplastic resin)/(weight of the mixture);

$WF_2$=(weight of the polymeric resin)/(weight of the mixture);

$WF_3$=(weight of the non-crosslinked thermoplastic resin)/(weight of the mixture);

$MFI_1$=the melt flow index of the crosslinked thermoplastic resin;

$MFI_2$=the melt flow index of the polymeric resin; and $MFI_3$=the melt flow index of the non-crosslinked polymeric resin, wherein all melt flow indices are in grams/10 minutes and measured according to ASTM 1238-98 Condition 190/2.16.

32. The processed mixture formed by the method of claim 31.

* * * * *